United States Patent [19]

Rothberg

[11] 4,218,258

[45] Aug. 19, 1980

[54] HYDRAULIC CEMENT ADHESIVE COMPOSITIONS

[75] Inventor: Henry M. Rothberg, Woodbridge, Conn.

[73] Assignee: Laticrete International, Inc., Woodbridge, Conn.

[21] Appl. No.: 910,772

[22] Filed: May 30, 1978

[51] Int. Cl.$^2$ ............................................ C04B 7/353
[52] U.S. Cl. .................................. 106/93; 260/29.6 S; 260/3; 260/13; 260/17 R; 260/742
[58] Field of Search ............... 106/93, 90; 260/29.6 S, 260/3, 13, 17 R, 742

[56] References Cited

U.S. PATENT DOCUMENTS

| | | | |
|---|---|---|---|
| 3,716,386 | 2/1973 | Kempster | 106/93 |
| 3,955,992 | 5/1976 | Roberts | 106/93 |
| 4,021,257 | 5/1977 | Bernett | 106/93 |
| 4,043,827 | 8/1977 | Bernett | 106/93 |
| 4,069,062 | 1/1978 | Burge | 106/93 |
| 4,070,199 | 1/1978 | Downing | 106/93 |

*Primary Examiner*—James Poer
*Attorney, Agent, or Firm*—DeLio and Montgomery

[57] ABSTRACT

An improved hydraulic cement is provided for use upon admixture with aqueous media, preferably either water or aqueous latex, and primarily comprises a hydraulic cement, a polyethylene oxide homopolymer and an alkyl derivative of cellulose, preferably a hydroxyalkyl cellulose.

16 Claims, No Drawings

HYDRAULIC CEMENT ADHESIVE COMPOSITIONS

BACKGROUND OF THE INVENTION

1. Field of the Invention

The present invention relates to improved hydraulic cement adhesive compositions which are particularly adapted to be admixed with water or aqueous media and used wherever thin set mortars or tile adhesives are required. Such uses include, for example, installing ceramic tile, brick, ceramic mosaics, marble, quarry tile, slate, pavers or stone over surfaces including concrete, masontry, brick, gypsum wall board, gypsum plaster, or stone.

When admixed with latex compositions, the hydraulic cement adhesive compositions of the invention can advantageously be utilized on surfaces such as asbestos, cement board, plywood, wood surfaces and flakeboard.

2. Description of the Prior Art

Conventional cement adhesives or mortars, contain hydraulic cement, generally Portland or calcium aluminite cement, sand and fillers, such as limestone.

While such conventional mortars provide bonding properties, non-flammability characteristics and resistance to attack by insects, fungi or rodents, they are deficient in certain applications. In particular, relatively thick layers are required for tile-setting purposes and such layers not only involve substantial labor in mixing and application, but also lack the desired high-bonding strength and a resistance against the effects of shock, frost and moisture.

In order to provide hydraulic cement compositions which could be applied in thin layers, particularly for use in vertical applications such as tile on walls, it has been known in the prior art to incorporate finely divided inorganic fibers, for example mineral wool, glass wool, asbestos or the like, in hydraulic cement-based mortars. This improved the thixopropic properties of the mortar and thereby improved somewhat the sagging and poor adhesion of these mortars in thin layer applications. However, incorporation of such fibers involves increased expense and, particularly in the case of asbestos, poses a potential health problem to those making or applying the materials. Fiber glass is an irritant to the skin and can cause dermatitis to workmen continuously exposed to it.

Furthermore, cellulose and alkyl derivatives of cellulose, for example methyl cellulose, hydroxymethyl cellulose, hydroxyethyl cellulose, hydroxypropyl cellulose, and the like, have been incorporated into hydraulic cement compositions to improve its adaptability to thin layer applications. For example, U.S. Pat. Nos. 2,820,717; 2,934,932; 3,243,307 and 3,824,101 all disclose incorporation of one or more alkyl cellulose materials in hydraulic cement mortar compositions of the general type upon which the present invention is an improvement.

However, even with the addition of cellulose and alkyl cellulose materials, conventional mortar compositions lack the desired high-bonding strength, superior resistance to chemicals, shock and frost, and permanent water-proof bonding which is desired, particularly in thin layer applications.

SUMMARY OF THE INVENTION

The present invention provides a novel and advantageous improvement over conventional mortars and hydraulic cement adhesive compositions of the prior art and provides substantially improved high-bond strength and chemical resistance as well as improved shock resistance, resistance to frost, all while providing a high tack and ease of use.

The improved hydraulic cement adhesive composition of the invention comprises a hydraulic cement, preferably Portland cement, an alkyl derivative of cellulose, preferably hydroxypropyl methyl cellulose, hydroxyethyl cellulose, hydroxymethyl cellulose or sodium carboxy methyl cellulose, and a polyethylene oxide homopolymer. When admixed with aqueous media, preferably either water or an aqueous latex, the novel composition of the invention can advantageously be utilized in thin layers for permanent adhesion applications.

Accordingly, it is a principal object of the present invention to provide an improved hydraulic cement adhesive composition which, upon admixture with aqueous media, provides an easily workable and applicable mortar/adhesive, particularly well suited for thin layer applications, and providing exceptionally high-bonding strength and long lasting chemical resistance, as well as excellent resistance to shock and frost.

It is a further object of the invention to provide a hydraulic cement mortar/adhesive which is more economical and easy to use and apply than conventional mortars, and which composition is free of inorganic fibers or materials, most notably asbestos and glass fibers.

Other objects and advantages of the present invention will be apparent to those skilled in the art from study of the following description and appended claims.

DESCRIPTION OF THE PREFERRED EMBODIMENTS

Preferred embodiments of the novel hydraulic cement adhesive compositions of the invention are essentially dry mixtures comprising from about 20–99.4 weight % hydraulic cement and about 0.5 to 4.0 weight %, based upon the amount of hydraulic cement, of an alkyl derivative of cellulose and about 0.1 to 5.0 weight %, also based upon the amount of hydraulic cement, of a polyethylene oxide homopolymer. Optionally, up to about 79.5 weight % of sand, crushed limestone or other inert filler material can also be utilized in the dry mixture.

For purposes of the invention, any hydraulic cement can be utilized, although preferably Portland or calcium aluminite cement are utilized. Furthermore, while any type of conventional filler material for use in conjunction with hydraulic cement can be utilized in accordance with the invention, preferably sand or limestone are used, as may be crushed pumice, pozzolithic cements or expanded light-weight aggregates, for example vermiculite, perlite or the like.

The preferred polyethylene oxide homopolymers used in accordance with the invention are those containing the common or repeating structure:

—(O—CH$_2$CH$_2$)$_n$, wherein n ranges from about 8,000 to 80,000, the resulting molecular weight ranges between about 400,000 to 4,000,000 and the viscosity, measured in a 1% aqueous solution, ranges between about 15 to 4,000 cps (centipoise). The amount of polyethylene oxide homopolymer used varies in an inverse relationship with the molecular weight of the homopolymer. Thus, with the higher molecular weight range material, the amount used is at the lower end of the 0.1 to 5.0 weight % range, based on the amount of hydraulic cement, and vice versa when lower molecular weight material is used.

Such polyethylene oxide homopolymers exhibit thermoplastic properties and are completely soluble in water. They form films which are inherently flexible, though tough and particularly resistant to chemical attack and hydrophobic materials, such as grease or oils. In aqueous solution, these polyethylene oxide homopolymers in combination with the other ingredients of the invention provide a hydraulic cement adhesive composition which exhibits excellent tack, without slippage when used on vertical applications.

The alkyl derivatives of cellulose which are preferably utilized in the hydraulic cement adhesive compositions in the invention are methyl cellulose, sodium carboxy methyl cellulose, hydroxymethyl methyl cellulose, hydroxyethyl methyl cellulose, hydroxypropyl methyl cellulose and hydroxybutyl methyl cellulose. It is also fully within the purview of the invention that other alkyl derivatives of cellulose can be advantageously utilized in the hydraulic cement adhesive compositions of the invention, for example hydroxymethyl cellulose, hydroxyethyl cellulose and hydroxypropyl cellulose.

The amount of alkyl derivative of cellulose used varies inversely with viscosity of the particulr material used, which preferably ranges from about 6,000 to 75,000 centipoise (cps). However, higher viscosity alkyl derivatives of cellulose could be utilized in accordance with the invention. Thus, when using the higher viscosity materials, the amount used is in the lower end of the 0.5 to 4.0 weight % range based upon the amount of hydraulic cement present in the mixture, and vice versa when lower viscosity material is used.

Furthermore, preferred embodiments of the novel hydraulic cement adhesive compositions of the invention may contain optional additives conventionally utilized in hydraulic cement-based mortar compositions. These include, but are not limited to, conventional defoamers, coloring agents, such as mineral oxide, odor masks, such as perfumes and the like, dry dispersing agents which improve flow and wetability of the dry material when admixed with aqueous media, and cement accelerators, such as calcium chloride, sodium chloride, barium chloride and the like. It should be understood, that for purposes of the present invention, any conventional additive for dry hydraulic cement adhesive compositions may be optionally provided in the novel compositions of the invention.

The following examples are set forth to illustrate the novel and improved hydraulic cement adhesive compositions of the invention. It is understood, however, that while these examples are illustrative of preferred embodiments, the invention is in no way limited strictly to these examples.

EXAMPLE 1

| | % by weight |
|---|---|
| Hydroxypropyl methyl cellulose viscosity at 2%, 75,000 cps. | 0.50% |
| Polyethylene oxide homopolymer approx. Molecular weight, 4,000,000 | 0.30% |
| Hydraulic cement | 99.20% |

EXAMPLE 2
(preferred formulation)

| | |
|---|---|
| Hydroxypropyl methyl cellulose viscosity at 2%, 75,000 cps. | .17% |
| Polyethylene oxide homopolymer approx. Molecular weight 4,000,000 | .10% |
| Hydraulic cement | 31.89% |
| Sand | 67.84 |

EXAMPLE 3

| | |
|---|---|
| Hydroxypropyl methyl cellulose viscosity at 2%, 75,000 cps. | .50% |
| Polyethylene oxide homopolymer approx. Molecular weight 400,000 | 5.00% |
| Hydraulic cement | 94.50% |

EXAMPLE 4

| | |
|---|---|
| Hydroxymethyl cellulose viscosity at 2%, 6,000 cps. | 3.00% |
| Polyethylene oxide homopolymer approx. Molecular weight, 4,000,000 | .30% |
| Hydraulic cement | 96.70% |

EXAMPLE 5

| | |
|---|---|
| Hydroxymethyl cellulose viscosity at 2%, 6,000 cps. | 2.94% |
| Polyethylene oxide homopolymer approx. Molecular weight, 400,000 | 4.90% |
| Hydraulic cement | 92.16% |

EXAMPLE 6

| | |
|---|---|
| Hydroxyethyl cellulose viscosity at 2%, 30,000 cps. | 1.10% |
| Polyethylene oxide homopolymer approx. Molecular weight, 4,000,000 | .30% |
| Hydraulic cement | 98.60% |

EXAMPLE 7

| | |
|---|---|
| Hydroxyethyl cellulose viscosity at 2%, 30,000 cps. | 1.00% |
| Polyethylene oxide homopolymer approx. Molecular weight, 400,000 | 5.00% |
| Hydraulic cement | 94.00% |

In the above examples, the constituents, which are substantially in a dry state, are thoroughly blended to produce a dry mixture. Each mixture was then combined with approximately two gallons of water per 40 lbs. of dry mix in a sufficient quantity to produce a plastic and trowable wet mortar. After initial mixing, the wet mortar was allowed to sit for 10 minutes to optimize the "wetting out" of the hydraulic cement and other originally dry constituents.

This wet mortar possessed a long open time, approximately one hour with a ¼ inch×¼ inch notched trow. The mortar set within about two hours after mixing, thereby enabling the joints to be filled with grout without danger of breaking the newly applied mortar bond.

In applying the wet mortar, because of its inherently high degree of tack, there was no slippage or sag when four ¼ inch×four ¼ inch ceramic tiles were applied on a vertical surface upon which a thin layer of a wet mortar of the invention was applied.

Particularly with regard to Examples 1-3, wherein hydroxypropyl methyl cellulose having a viscosity @ 2% of 75,000 cps. was utilized, the water retention of the mortars produced in accordance therewith was found to be equal to that provided by the prior art technique of combining two different hydroxy alkyl cellulose materials.

Alternatively, the hydraulic cement adhesive compositions of the invention can be admixed with a suitable aqueous latex, instead of water, in order to provide a wet mixture or wet mortar which is particularly well suited and advantageously utilized in thin layer applications. While it is within the purview of the invention that any type of conventional aqueous latex can be utilized, it is preferable to use either styrene-butadiene rubber, Neoprene, natural latex or "HAVEA latex", butyl latex, acrylic latex, polyvinyl acetate latex, or mixtures thereof. Most preferably, styrene-butadiene rubber (SBR) containing about 10-45 weight %, and preferably 20-40 weight % solids and stabilized with non-ionic and ionic surfactants is utilized for admixture with the novel hydraulic cement adhesive compositions of the invention. In this connection, it is particularly advantageous to utilize minor quantities of defoaming agents, as well as anti-fungicidal agents.

Utilization of such an aqueous latex in connection with the above-identified dry hydraulic cement adhesive compositions, greatly enhances the performance and properties of the compositions in their workable form (i.e. wet mortar), and also contributes to improved shear bonding, and resistance to the effects of freeze-thaw cycles. Furthermore, tiles applied to a thin film of such novel mortars of the invention on a vertical surface can be adjusted for up to about 25 minutes after application, without adversely effecting the bond. The preferred formulation set forth in Example 2, above, when combined with an aqueous latex, provided excellent adhesion over plywood surfaces which are highly susceptible to shearing when using conventional dry-set mortars.

Since changes may be made in the dry mixes of this invention by one skilled in the art, without departing from the scope of this invention, it is intended that all matter contained in the preceding description be interpreted as illustrative and not in a limiting sense.

Although the preceding Examples are presented solely for purposes of illustration, it will be understood that such compositions may be altered, varied or modified without departing from the spirit and scope of the invention as defined by the appended claims.

What is claimed is:

1. An improved hydraulic cement adhesive composition for use upon admixture with aqueous media comprising hydraulic cement, an alkyl derivative of cellulose, and a polyethylene oxide homopolymer having an approximate molecular weight ranging between 400,000 to 4,000,000 and having the common repeating structure:

—(O—CH$_2$CH$_2$)$_n$— wherein n ranges from about 8,000 to 80,000, said polyethylene oxide homopolymer being provided in a range from about 0.1 to 5.0 weight %, based upon the weight of hydraulic cement.

2. The improved hydraulic cement adhesive of claim 1 wherein said hydraulic cement is Portland cement.

3. The improved hydraulic cement adhesive of claim 1 wherein said alkyl derivative of cellulose is selected from one or more of methyl cellulose, sodium carboxy methyl cellulose, hydroxymethyl methyl cellulose, hydroxyethyl methyl cellulose, hydroxypropyl methyl cellulose, and hydroxybutyl methyl cellulose.

4. The improved hydraulic cement adhesive of claim 1 wherein said alkyl derivative of cellulose is selected from hydroxymethyl cellulose, hydroxyethyl cellulose or hydroxypropyl cellulose.

5. The improved hydraulic cement adhesive of claim 3 wherein said alkyl cellulose is hydroxypropyl methyl cellulose having a viscosity of about 75,000 cps. in a 2% aqueous solution at 25° C.

6. The improved hydraulic cement adhesive of claim 1 wherein said hydraulic cement ranges from about 20 to 99.4 weight %, said alkyl derivative of cellulose ranges from about 0.5 to 4.0 weight %, based upon the weight of hydraulic cement.

7. An improved hydraulic cement adhesive for use upon admixture with aqueous media comprising:

| | Weight % |
|---|---|
| Hydroxypropyl methyl cellulose viscosity at 2%, 75,000 cps. | 0.50 |
| Polyethylene oxide homopolymer approx. Molecular weight, 4,000,000 | 0.30 |
| Hydraulic cement | 99.20 |

8. An improved hydraulic cement adhesive for use upon admixture with aqueous media comprising:

| | Weight % |
|---|---|
| Hydroxypropyl methyl cellulose viscosity at 2%, 75,000 cps. | .17 |
| Polyethylene oxide homopolymer approx. Molecular weight, 4,000,000 | .10 |
| Hydraulic cement | 31.89 |
| Sand | 67.84 |

9. An improved hydraulic cement adhesive for use upon admixture with aqueous media comprising:

| | Weight % |
|---|---|
| Hydroxypropyl methyl cellulose viscosity at 2%, 75,000 cps. | .50 |

-continued

|  | Weight % |
| --- | --- |
| Polyethylene oxide homopolymer approx. Molecular weight, 400,000 | 5.00 |
| Hydraulic cement | 94.50 |

10. An improved hydraulic cement adhesive for use upon admixture with aqueous media comprising:

|  | Weight % |
| --- | --- |
| Hydroxymethyl cellulose viscosity at 2%, 6,000 cps. | 3.00 |
| Polyethylene oxide homopolymer approx. Molecular weight, 4,000,000 | .30 |
| Hydraulic cement | 96.70 |

11. An improved hydraulic cement adhesive for use upon admixture with aqueous media comprising:

|  | Weight % |
| --- | --- |
| Hydroxymethyl cellulose viscosity at 2%, 6,000 cps. | 2.94 |
| Polyethylene oxide homopolymer approx. Molecular weight, 400,000 | 4.90 |
| Hydraulic cement | 92.16 |

12. An improved hydraulic cement adhesive for use upon admixture with aqueous media comprising:

|  | Weight % |
| --- | --- |
| Hydroxyethyl cellulose viscosity at 2%, 30,000 cps. | 1.10 |
| Polyethylene oxide homopolymer approx. Molecular weight, 4,000,000 | .30 |
| Hydraulic cement | 98.60 |

13. An improved hydraulic cement adhesive for use upon admixture with aqueous media comprising:

|  | Weight % |
| --- | --- |
| Hydroxyethyl cellulose viscosity at 2%, 30,000 cps. | 1.00 |
| Polyethylene oxide homopolymer approx. Molecular weight, 400,000 | 5.00 |
| Hydraulic cement | 94.00 |

14. An improved hydraulic cement adhesive mortar comprising the improved hydraulic cement adhesive of claim 1 in admixture with water.

15. An improved hydraulic cement adhesive mortar comprising the improved hydraulic cement adhesive of claim 1 in admixture with an aqueous base latex.

16. The improved hydraulic cement adhesive mortar of claim 15 wherein said latex is selected from styrene-butadiene rubber, Neoprene, natural latex, HAVEA latex, butyl latex, acrylic latex, polyvinyl alcohol latex or epoxy ester emulsions.

* * * * *